Patented July 29, 1947

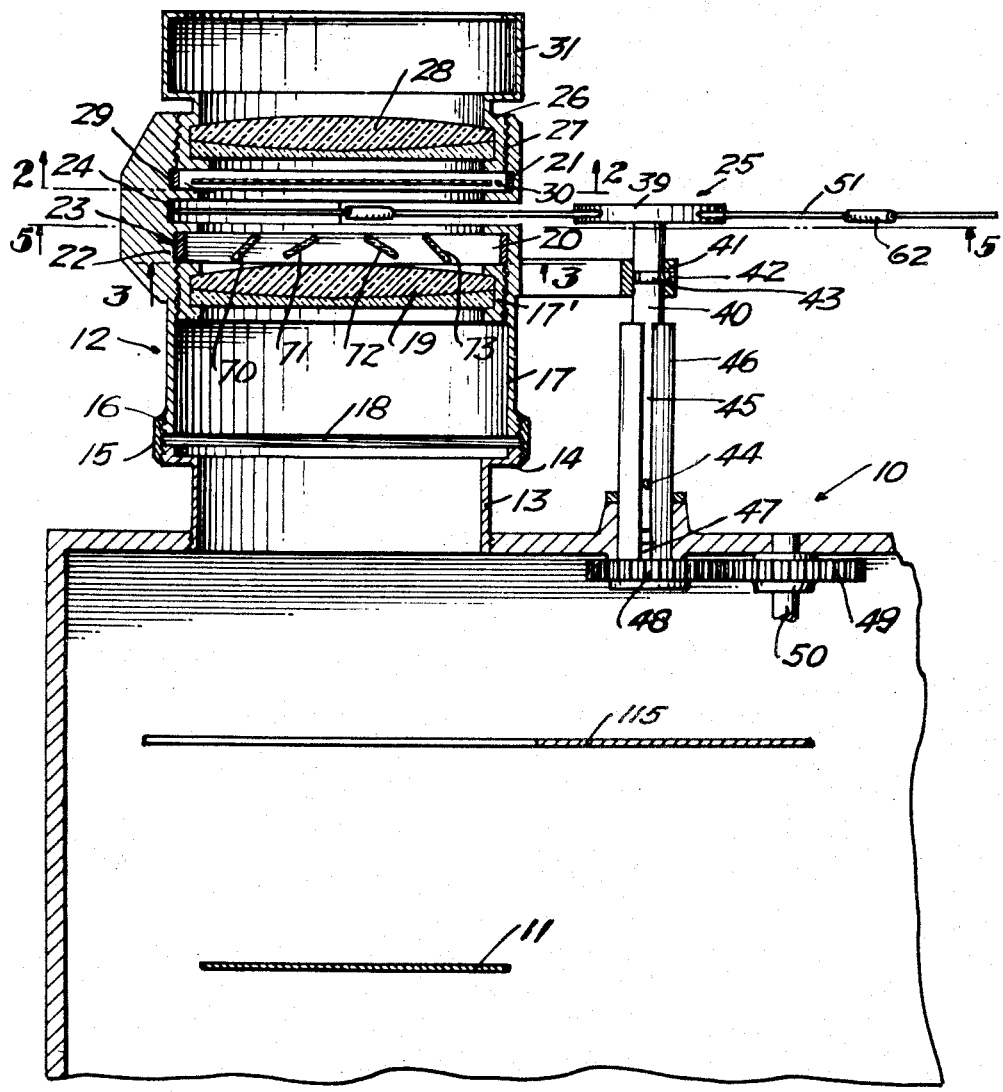

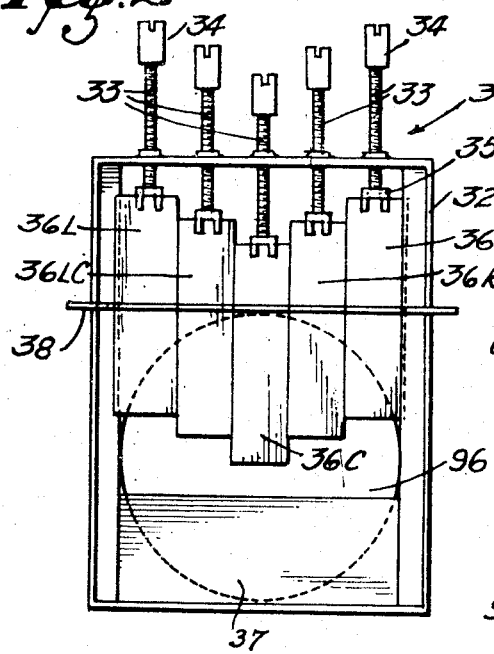

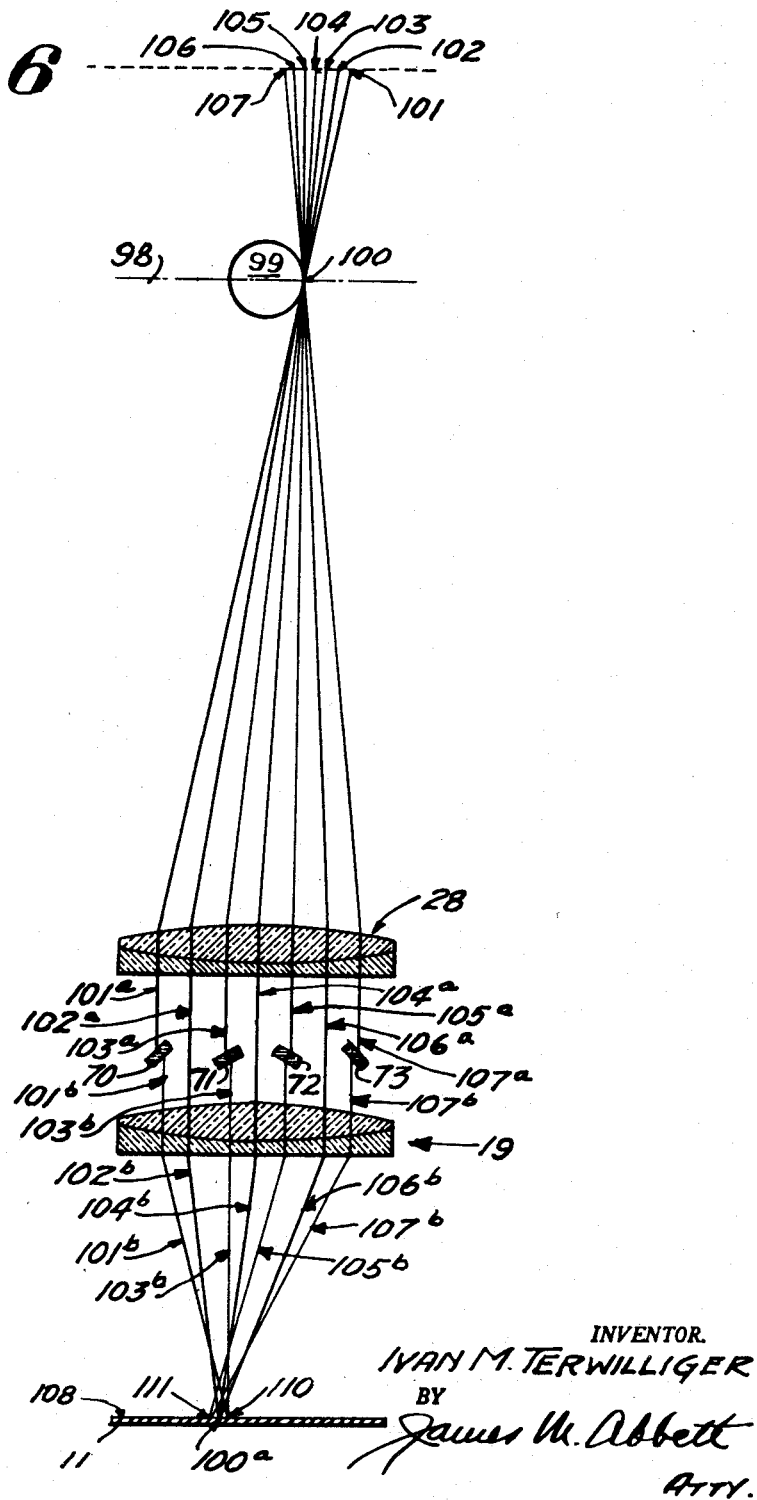

2,424,592

UNITED STATES PATENT OFFICE 2,424,592

SUBTRACTIVE METHOD AND MEANS OF OPTICAL IMAGE MODULATION

Ivan M. Terwilliger, Pasadena, Calif.

Application July 12, 1943, Serial No. 494,419

30 Claims. (Cl. 88—16.6)

1

This invention relates to the production of motion pictures, whereby an illusion of depth will be created, and particularly pertains to a subtractive method and means of optical image modulation, and is a continuation in part of my co-pending application entitled "Method of producing relief effects in optical images," filed September 27, 1939, and bearing Serial No. 296,831, which matured into Patent Number 2,331,941, issued October 19, 1943.

Heretofore, attempts have been made to produce the illusion of depth, or third dimension, in a motion picture projected onto a screen by preparing photographs of a given scene as viewed and photographed from alternate right- and left-hand aspects. In such methods an attempt is made to properly superimpose the images appearing within a scene and successively viewed from different aspects so that persistence of vision will tend to give depth to the scene and a semblance of contour to objects appearing in the scene. Other attempts have been made to produce motion pictures giving an illusion of depth, and which pictures must be viewed on the screen with special viewing apparatus. These two methods of prior art development in the making of third dimension motion pictures have for the most part been objectionable due to the equipment required, its special manipulation, and the fact that the projected pictures lack clear definition and do not produce the illusion desired. In my U. S. Patent No. 2,286,242, entitled "Optical image system," issued June 16, 1942, I have disclosed a single lens objective which will formulate optical images in a plurality of diverse forms which may be combined in harmonious combinations upon a photographic film to provide a picture giving an illusion of plastic relief or depth. Experimentation has proved that the particular field of photography of my previous inventions and this present system, which I choose to call "Intecyan," makes it possible to obtain an illusion of natural depth as it is present within a scene being photographed without the aid of multiple objectives, multiple track films, or special viewing apparatus, and while placing the individual objects or planes of a scene to be photographed completely in the control of the photographer, whereby the photographed scene may have any aspect thereof or any viewpoint thereof in dominance, and the light densities of the viewpoint may be recurrently varied or otherwise controlled to create an illusion of natural depth and contour in the eye and mind of the observer when the photographed scene is projected upon the usual

2 motion picture screen with standard projecting apparatus. It is the principal object of the present invention, therefore, to provide a method and apparatus of producing optical image modulation to create an illusion of depth of a scene having a plurality of planes of depth by passing a beam of light from the scene through an objective while constantly maintaining a preponderance of the beam of light effective in all of the exposures, and at the same time subtracting a fraction of said beam of light recurrently from selected areas of a transverse plane through which the beam passes to thus create an internal modulation of the light beam acting to vary the light density of the contour of various foreground objects in the scene being photographed to create the illusion of separation between different planes of depth in the scene and an appearance of roundness in the foreground figures.

The present invention contemplates the provision of a camera of the type commonly used for taking motion pictures or for television work, and which camera is fitted with a lens objective through which a beam of light passes from a scene to a photographic film, the film being moved in synchronism with shutter mechanism and in synchronism with a subtractive light modulator, the lens objective having associated with it a multiple leaf diaphragm gate and a light refractory unit, said combination of elements being provided for carrying out the method of subtractive optical image modulation as herein disclosed.

The invention is illustrated by way of example in the accompanying drawings in which:

Figure 1 is a view in horizontal section indicating a fragmentary portion of a motion picture camera and the lens objective and associated elements required for practising the present invention.

Fig. 2 is a view in transverse section through the light tube of the lens objective as seen on the line 2—2 of Fig. 1 and discloses the multiple leaf diaphragm light gate.

Fig. 3 is a view in transverse section through the light tube of the lens objective as seen on the line 3—3 of Fig. 1 and discloses the adjustable refractory unit.

Fig. 4 is a view in plan as seen on the line 4—4 of Fig. 3 and discloses the adjustable structure for the refractory strips.

Fig. 5 is a view in transverse section and elevation as seen on the line 5—5 of Fig. 1 and shows the details of the subtractive light modulator.

Fig. 6 is a view in diagram indicating a compound light beam in its path from natural space and showing the potential internal change in the beam caused by the action of the subtractive light modulator operating periodically.

Fig. 7 is a view drawn on a reduced scale showing an alternate form of modulator.

Referring more particularly to the drawings, 10 indicates the usual motion picture camera containing film feed mechanism and a synchronized shutter. Through the camera a photographic film 11 is fed. The details of the feeding and shutter mechanism need not be disclosed in the present application since the invention is particularly concerned with the lens objective and associated parts through which a beam of light travels from a scene to the film. Mounted at the forward end of the camera 10 and having its longitudinal axis disposed normal to the plane of the photographic film 11 is a light tube 12. This tube is here shown as comprising a tubular section 13 having a flanged portion 14 at its forward end. The flanged portion 14 is cylindrical and is threaded to receive an adjusting ring 15 by which the objective may be moved to focus the camera. The flange 14 is of larger diameter than the tubular section 13 and abuts against a flanged portion 16 of a tubular section 17. This flanged portion is also externally threaded to receive the adjusting ring 15. Vertical guideway grooves occur between the parallel shoulders of the flanges 14 and 16, as indicated at 18. Into this groove various elements may be placed and when desired removed. The length 17 of the light tube 12 is internally threaded and receives a bezel 17'. The bezel 17' carries a rear element 19 of the lens objective. The forward end of the tubular member 17 fits within a bore 20 of a frame element 21. The frame element has vertical recesses 22 within which an adjustable refractory unit 23 may be mounted. Disposed forwardly of the recesses 22 within the frame 21 is a recess 24 which is open at one side of the light tube to accommodate the subtractive light modulator generally indicated at 25. In advance of the transverse slotted opening 24 a length of light tube 26 is provided. This is internally threaded to receive a bezel 27 carrying the forward element 28 of the lens objective. Formed within the portion of the light tube 26 occurring at the rear of the lens 28 are vertical recesses 29 within which a multiple leaf diaphragm light gate 30 may be mounted. Disposed at the forward end of the tube portion 26 is the usual shadow box 31.

Referring particularly to Fig. 2 of the drawing, it will be seen that the multiple leaf diaphragm light gate 30 is disclosed in detail. This gate includes a rectangular frame 32 which fits within the recesses 29 formed in the light tube and disposes the frame in a transverse plane normal to the optical axis of the lens objective. The upper transverse portion of the frame is formed with a plurality of spaced vertical openings which are threaded to receive threaded adjusting screws 33. These screws are here shown as having heads 34 at their upper ends, each formed with a screw-driver groove. The lower ends of each of the screws 33 are fitted with hangers 35 freely rotatable thereon. The hangers carry dependent diaphragm leaves, here indicated by the numerals 36R, 36CR, 36C, 36LC, and 36L. The leaves are rectangular in shape and parallel to each other along contiguous edges. As shown in Fig. 2 of the drawing, the leaves may be separately adjusted, so that any desired area within the light tube 12 and within a plane normal to the optical axis thereof may be blocked out to interrupt the direct passage of light from the photographic subject to the film. It is desirable, however, that the individual leaves be used to block out selected portions of the upper half of the section of the light tube. The lower half of this section may be blocked out by a mask 37. It is to be understood that the mask 37 and the series of leaves 36R, etc., are made of thin opaque material. The mask 37 is slidably mounted in the side rails of the frame 32 so that it may be vertically adjusted. Suitable guide means may be provided for the shutters 36R, etc. to prevent them from rotating with the screws 33. This guide means may be a transverse element, such as indicated at 38. It will thus be seen that the leaf diaphragm light gate will control the passage of light through the light tube and adjust the intensity of the light in selected areas in an entirely different manner from that accomplished by the expansion and contraction of an iris, thereby making it possible to establish a particular point of view as dominant within the aperture while producing the light values in other areas of the aperture in any respective amounts determined by the operator. However, to produce film frames of uniform average density successively in the photographing, when using the particular modulator here illustrated the light values may be made equal to those areas of the aperture which are obturate during modulation of the light rays. This does not mean that the viewpoint must have equal aperture area, since the sides of the average lens element tend to transmit lesser light relative to the open area. Thus, diaphragm leaves 36R and 36L may be raised higher than diaphragm leaves 36CR and 36CL. To facilitate accurate regulation the side diaphragm leaves 36R and 36L may be connected to operate in unison. This may also be done with the diaphragms 36CR and 36CL. Thus each pair may be adjusted as a unit imparting an equivalent movement to each gate so paired simultaneously.

Referring particularly to Fig. 5 of the drawing, the details of a light modulator are disclosed. Here it will be seen that the modulator comprises a hub 39 which is mounted upon a shaft 40. The shaft 40 is supported rotatably upon an arm 41 here shown as formed integral with the light tube frame structure 21. The shaft is held against longitudinal movement with relation to the arm 40 by pins 42 and washers 43. The shaft carries a drive pin 44 which is positioned within a longitudinal slot 45 of a drive sleeve 46. The sleeve 46 is in fixed longitudinal alignment with a shaft 47 carrying a pinion 48. The pinion 48 meshes with a gear 49 upon a shaft 50. This shaft is driven through the medium of suitable timing mechanism associated with the main drive of the camera and its details of construction need not be disclosed further. The hub of the light modulator element carries a plurality of radial arms indicated by the numerals 51, 52, 53, and 54. It is understood that when the light modulator with four arms is to be used that the shaft 40 will be driven at a speed of four frames of the film to one revolution of the modulator. In the event that other forms of light modulator wheels are used carrying a greater number of radial arms, the ratio of rotation of the modulator to the feed of the film will be changed proportionately. Each of the radial arms carries a light ray interruptor or light subtractor, whereby a selected area of the light beam traveling into the camera along its optical axis will be interrupted in one or more frames of the photographic film being exposed. In the form of the modulator wheel 25 shown in Fig. 5 of the drawing it will be seen that the radial arm 51 carries an interruptor blade 55, and that radial arms 52, 53 and 54 carry interruptor blades 56, 57 and 58, respectively. These blades are made of relatively thin opaque material and are arcuate in form so that they will move in concentric circles around the axis of shaft 40, and so that their trailing ends may stand in positions of light obstruction during the interval of exposure of the film. It is preferable that the interruptors shall be formed with a cylindrical portion 59 disposed radially of the arc of the blade and having a flat key 60 at its end. The cylindrical portion 59 is externally threaded and may be brought to abut against the free end of the radial arms so that the key 60 may be inserted into a slot 61, after which an oppositely threaded connecting sleeve 62 may be used to draw the portion 59 against the end of the rod to hold the same rigidly. A lock screw 63 may be provided to hold the sleeve in its set position. It is to be understood that while the interruptors are shown in Fig. 6 as each having only one blade, that if desired additional blades may be formed and radially spaced so that any desired pattern of light subtraction may be produced by the modulator. It is also to be understood that the modulator wheel 25 is synchronised in its movement with the film frame exposure mechanism of the camera, whereby one complete frame exposure is made and ended within an interval of time beginning when one of the radial arms has passed over the optical axis completely and ending previous to the time the next adjacent radial arm begins to pass across the optical axis. The synchronization of the mechanism is also designed to insure that the camera shutter is closed while the radial arms pass across the path of the beam of light. It is also understood that graduations may be placed upon the radial arms so that the various blades may be set conveniently. For example, the modulators may be positioned, selectively, to obturate substantially only bundles of light rays which pass through the spaces between refractors. This leaves untouched the light rays which are deflected by the refractors. It may also be desirable to arrange the structure so that the modulators may be positioned to obturate selectively only bundles out of the rays which pass through the refractors. Furthermore, the modulators might be positioned to obturate selectively bundles of rays which are composed of a portion of each type.

Disposed in the vertical recesses 22 of the frame element 21 is mounted the adjustable refractory unit 23. This unit is shown in detail in Figs. 3 and 4 of the drawing. Here it will be seen that a holder 64 is provided having parallel vertical sides 65 and 66 and transverse top and bottom portions 67 and 68 to form a rigid holder substantially square in shape. The transverse width of the various elements of the holder agree with the width of the recesses 22 so that the holder may be bodily moved to a seated position when the recesses are removed therefrom. The upper horizontal portion 67 of the holder has oppositely overhanging sections 69 at its ends which tend to form a light seal and provide a grasping surface so that the holder may be handled. It will be understood that the holder is disposed with its center substantially in alignment with the optical axis of the camera, and that a beam of light traveling from the forward optical element 28 to the rear optical element 19 will pass through the holder opening. Mounted within this opening and disposed upon parallel vertical axes are refractor blades 70, 71, 72 and 73. These blades are relatively thin strips of optical glass. The outer vertical edges of the blades are slightly convexed and the refractory values of the individual blades are such as to change the focal length of the light beams which pass through them with reference to the photographic image as represented on the film 11. The blades 70—73, inclusive, are provided with fittings 74 at their lower ends carrying a vertical trunnion 75 which extends into a bearing seat formed in the lower transverse holder element 68. The upper ends of the blades are provided with fittings 76 carrying trunnions 77 which extend upwardly through bearing openings in the upper transverse holder section 67.

In considering the refractor blades and their action, blade 70 will be designated as the left refractor, blade 71 as the left-center refractor, blade 72 as the right-center refractor, and blade 73 as the right refractor. It is desirable that these blades shall be set at different angles with relation to each other and shall be adjusted simultaneously to assume different set positions. Thus, the left and right refractor blades 70 and 73, respectively, are disposed in opposite angular relation to each other and at equal angles to a plane normal to the optical axis of the camera. Likewise, left-center and right-center blades 71 and 72, respectively, are disposed at opposite angles to each other and at equal angles to a plane normal to the optical center of the camera. However, the angular disposition of the right-center and left-center blades is preferably less than the angular disposition of the right and left blades. It is to be understood that this arrangement is not absolutely necessary, but that conditions may vary so that different angular arrangements of the refractor blades would be desirable. It is preferable, however, that the blades should be simultaneously adjusted when changing their angularity and so that there would be a lesser movement of adjustment made upon the left-center and right-center blades 71 and 72, respectively, as compared with the adjustment of the left and right blades 70 and 73, respectively. This is accomplished by the structure shown in Fig. 4, where an adjusting shaft 78 is indicated as being mounted within bearings 79 and 80 carried by the upper plate 67 of the holder 64. A knurled head 81 is mounted at one end of the shaft to facilitate in its rotation. Carried upon the shaft are worm gears 82, 83, 84 and 85. These gears are in mesh with complementary worm gears 86, 87, 88 and 89. The last named set of gears are mounted individually upon the upper trunnion 77 of the blades 70—73, inclusive. It is to be understood that the gears 82 and 83 on the shaft 78 and gears 86 and 87 meshing therewith are left-hand gears, and that the gears 84 and 85 and gears 88 and 89 meshing therewith are right-hand gears. Thus, when the shaft 78 is rotated the right and left-hand sets of refractor blades will be simultaneously rotated upon their axes but in opposite directions. In view of the fact that it is desirable to produce a different degree of adjustment for the blades 71 and 72 than for blades 70 and 73 the gear ratio between said first mentioned pair of blades is less than the gear ratio between the second pair of blades, whereby the blades 70 and 73 will rotate a greater distance than the blades 71 and 72 when the adjusting shaft 78 is rotated.

In order to determine the angular relation of the various refractor blades to each other, it is desirable to inscribe a transverse score mark 90 diametrically of the upper face of each of the gears 86—89, inclusive, said score mark being fixed with relation to the blade associated with any one of these gears so that the angular position of the gears may be indicated visually, according to calibrations.

It is to be understood that the widths of the blades 70—73, inc., are such that under no conditions will they combine to present a continuous screen through which the light beam must pass. They are in fact of a width and are spaced with relation to each other and the holder 64 so that a plurality of parallel vertical light passageways will be formed. These are indicated in Fig. 3 at 91, 92, 93, 94 and 95. The passageways 91 and 95 occur between the blades 73 and 77 and the portions 65 and 66 of the frame 64. The passageway 92 occurs between the blades 70 and 71, while the passageway 94 occurs between the blades 72 and 73. It will thus be seen that these passageways are symmetrically arranged and spaced at opposite sides of the central passageway 93 which occurs between the blades 71 and 72. By angular adjustment of the refractor blades 70—73, inc. their vertical faces are presented to the light beam at desired angles to create a particular refractory condition, and will at the same time vary the effective width of the light passageways 91—95, inc. This insures that the percentage of refracted light in the light beam passing through the optical set may be varied and the degree of refraction controlled, so that as the light beam passes through the camera approximately at a plane traversing the nodal point of the lens it will be divided into a plurality of portions of relatively narrow horizontal width and relatively long vertical width, the portions alternately representing direct light and refracted light and producing the effect of deflecting selected ones of the various portions, laterally and oppositely, while slightly shortening their focal lengths, whereby the compound picture formulated upon the film will be in an appearance of substantially universal focus, attended additionally by illusion of natural depth.

It is to be understood that the forward lens element 28 and the rear lens element 19 are the usual elements for the production of optical images or for formulating a motion picture or television image. The lens shown in the drawing is for purposes of illustration only.

From the foregoing description it will be seen that a photographic camera for the taking of motion pictures has been provided which receives a beam of light from a photographic scene, which scene includes foreground and background subjects. The beam of light is passed through a forward optical element 28, then through the light opening in light gate 30, after which sections of the beam of light are momentarily interrupted by the blades 55—58, inc., of the subtractive light modulator 25, and then through the adjustable refractory unit 23 to the rear optical element 19, after which the beam of light strikes the film 11. The mechanical effect of this apparatus is that by adjusting the various leaves of the multiple leaf diaphragm light gate, a light opening 96 will be formed between the lower edges of these leaves and the member 37, as particularly indicated in Fig. 2 of the drawing. This light opening may be of any desired configuration which conforms to the requirement of transmitting equal light from laterally positioned viewpoints which are periodically obdurated and will control the density of light passing from the photographic subject to the film so that various sections of the photographic aperture may be balanced, so far as light density is concerned, or may be arranged with the center section of the sight viewpoint in predominance. When the light passes from the light gate to the subtractive light modulator it will be evident that the various portions of the light beam may be temporarily interrupted by the interposition of one of the arcuate blades 55—58, inc., in the path of the particular portion of the beam width. It will be understood that the modulator is synchronised to drive with the camera feed and shutter mechanism so that the radial arms 51—54, inc., will move across the path of the beam of light at the time the shutter is closed. When the beam of light reaches the refractor unit portions of the beam will pass through the light passageways 91—95, inc., and the remaining portions of the beam will pass through the refractor blades 70—73, inc. The portions of the beam which pass through the refractor blades 70 and 71 will be deflected to the left of their normal path of travel. The portions of the light beam passing through the refractors 72 and 73 will be deflected to the right of their normal path of travel.

The action and the objects obtained by this arrangement will be hereinafter disclosed with particular reference to Fig. 6 of the drawings. In Fig. 6 the light rays which are tangent to the surface contour of one side of the object are shown indicating their actual paths of travel through the lens objective and between and through the refractor blades 70—73, inclusive. It is to be understood that while the light rays indicated all pass from one side of the optical center, that light rays passing from the opposite side of the optical center if indicated upon the diagram would be a mere image of the rays shown. This last named set of rays has not been shown for the sake of convenience and in order to eliminate confusion in the view. In Fig. 6 a background plane of the scene to be photographed is indicated at 97. The foreground plane of the scene to be photographed is indicated at 98, and the foreground object at 99. The right contour of the foreground object is indicated at 100. Points in the right side of the natural background are indicated at 101 to 107, inclusive. Rays of light from these points are projected through the lenses 19 and 28 and fall upon the image reception area 108. The beams of light emanating from the points 101 to 107 in passing from the background plane 97 pass tangent to the surface contour of the object 99 and through the lens system onto the image reception area or film 108. The rays from the points 101, 103, 105 and 107 pass through the lens 19 along paths 101$^a$, 103$^a$, 105$^a$ and 107$^a$ to the refractors 70—73, inclusive. These rays are then deflected into positions as indicated at 101$^b$, 103$^b$, 105$^b$ and 107$^b$. The rays 101$^b$ and 103$^b$ are deflected oppositely and equally from rays 105$^b$ and 107$^b$. Rays 102$^a$, 104$^a$ and 106$^a$ pass between the refractors along their normal and undeflected paths of travel. Rays 102$^a$, 104$^a$ and 106$^a$ are superimposed upon the image reception plane 108 at a single point indicated at 109$^a$. Rays 101$^b$ and 103$^b$ converge onto plane 108 at a single point indicated at 110, and rays 105$^b$ and 107$^b$ converge onto plane 108 at a single point 111. However, by changing the angles of the refractors 71 and 72 the rays which are shown to converge at 110 may be separated to correspond to their normal positions on the background plane 98. This same effect may be produced upon rays 105b and 107b which are shown as converging at 111. The offsetting of the points of convergence 110 and 111 with relation to the point 100ª creates the effect of superimposing multiple views of the contour of the object 99 in a slight mis-registration one relative to another. In this mis-registration background points will appear intermingled with portions of the foreground object on the image reception plane 108. When the modulator functions and the conditions prevail as described light ray bundles are subtracted from the light beam. This subtraction creates recessive modulation internally among the compound rays formulating the interference phenomenon between foreground and background at the contour of the images.

When the structure which embodies the present invention is operated as herein described the light rays emanating from the image and falling upon the focal plane 108 can be brought into an appearance of substantially universal focus by readjusting the distance between the lens set and the film to any degree or appearance as may be desired by the photographer.

It will be understood that while a complete motion picture camera has not been designated in the drawings that a suitable film feeding mechanism is provided for the film 108 and operates in synchronism with a shutter designated at 115.

It will thus be further seen that a multiplicity of diverse rays from each and all objects of the scene, whether foreground or background, are formulated on the image reception area, and that the image of each object is composed of an overlay of component images, some of which are critically sharp and others of which are slightly diffused, and that the totality of the sharp images, in both foreground and back ground, predominates over the totality of the diffused images in both foreground and background.

The manner in which the various bundles of light rays of the total beam pass through the lens units and the refractor blades is best indicated in the following table in which C represents center, L represents left, and R represents right; CR', CL', R' and L' represent the bundle of light rays passing through the spaces between refractors:

| Internal Parallax of Viewpoint | Rays formulated to be | Picture sharp on | Other Plane |
| --- | --- | --- | --- |
| C | Normal | Foreground | Background slightly diffused. |
| CR | Deflected toward L. | Background | Foreground slightly offset to L. |
| CR' | Normal | Foreground | Background slightly diffused. |
| CL | Deflected toward R. | Background | Foreground slightly offset to R. |
| CL' | Normal | Foreground | Background slightly diffused. |
| R | Deflected toward L. | Background | Foreground offset toward L. |
| R' | Normal | Foreground | Background slightly diffused. |
| L | Deflected toward R. | Background | Foreground offset toward R. |
| L' | Normal | Foreground | Background slightly diffused. |

It will be seen from a study of the foregoing table that each picture taken is formulated from a compound image structure made up of light bundles segregated and handled in the nine examples set forth in the table, and that each photographed scene represents a majority of obturate images overlaid to a desired degree. This causes certain portions of the background light to be in critical focus in a plane in advance of the normal focal plane as the background light passes between the refractors. It will be seen that the rays passing through refractor blades CR and CL, when taken as a pair, converge to form a single common focus distinct from the normal critical focus of the lens. At the same time the background light which passes through the refractors is in critical focus upon the film, although the bundles of background light passing through the refractors undercut the foreground objects and thus create an illusion of depth in the scene photographed upon the film.

While the total light beam emanating from the photographic scene passes through the controlled light aperture 69 to and between the refractor blades 70—73, inc., portions of the light beam are momentarily interrupted in a variation of sight viewpoints across a plane normal to the light travel. This is accomplished by the modulator structure 25, which is in synchronism with the camera feed and shutter mechanism, and thus causes light interruption in a time cycle. The time cycle in the present case extends over four frames of film, since in the present case the modulator structure is shown with four blades, one of which blades remains in a light interrupting position during one exposure of the camera. It will be recognized that since the modulator is disposed adjacent to optical element 28 that the light effective rays which pass by and around the blades of the modulator are at the same time converging due to the action of lens 28 to produce an optical image of the scene being photographed and covering the entire area of the image reception plane 103, and which plane is occupied by the photographic film 11. Thus, in each frame of the film the optical image covers the entire field of the image reception area, and while the modulator blades affect the internal character of the optical image it does not deplete the normal area of the image in the image reception plane and does not tend to change the overall average density of the light beam as it strikes the image reception area. Attention is directed to the fact that the refractor blades are arranged so that each refractor blade is in juxtaposition to and facing a leaf of the light gate, whereby each light gate leaf controls the amount of light passing locally through a complementary refractor blade.

While the structure of the invention has been described as including the modulator shown particularly in Fig. 5, it is to be understood that various patterns of modulators may be interchanged with the one here disclosed without departing from the spirit of the invention, since the object of the modulator, broadly stated, is to maintain constantly a preponderance of the beam of light effective in each exposure while subtracting a fraction of the beam of light in a recurrent sequence at selected viewpoints, thus producing an internal modulation of the beam of light to vary the emphasis of the parallax while varying the light density of foreground images to create the illusion of separation between depth planes in the scene being photographed.

It will thus be recognized that by the method and means of photographing subjects as here disclosed a controlled light aperture pattern is created transversely of the equatorial area of a light beam, whereby gradation in light density may be created in adjacent areas of the aperture field, and which emerging light beam may then be interrupted in said different light density areas and in a given time cycle, after which the commingled portions of the light beam emanating from foreground and background planes of the photographic scene will be caused to strike the image reception plane of the film with all images in appearance of relatively sharp focus, and some out of the commingled image formations overlaid intermittently in laterally displaced positions, background rays undercutting the edges of foreground figures to produce the effect of contour in the various images and the illusion of depth in the photographed plane.

Attention is called to the fact that the present invention might be used with television apparatus and in cameras photographing a continuous sustained optical image. In that event the modulation unit 25 is replaced either by a continuous band or a shifting modulator. When a continuous band is used it is suitably marked to conform to the modulation process and may follow the teachings shown in my co-pending appliction Serial No. 296,831, although in the present case the band would be a negative of the element shown in that application. If a shifting modulator is used a thin opaque modulator strip would be provided shifting across the bundles of light beams from differing viewpoints while maintaining the strip constantly effective within the aperture.

Figure 7 is a view drawn on a small scale showing another form of modulator rotor from that shown in Fig. 5 and in which the light density is balanced at each exposure of the film as well as modulated.

While this invention suitably operated will directly photograph a satisfactory picture, yet in event the modulations are inaccurately calculated, or the apparatus improperly adjusted, or it is desired to make a blend and fusion of the pictures more complete than exists in the negative, then the positive film may be produced by printing according to the operations set forth in my Patent No. 2,173,866, entitled "The art in cinematography of producing fractional density combinations between differing aspects of a scene," issued September 26, 1939.

While I have shown the preferred form of apparatus and the preferred method of practising the invention, it is to be understood that various changes in the combination, construction and arrangement of parts, as well as the steps of the method, may be made by those skilled in the art without departing from the spirit of the invention as claimed.

Having thus described my invention, what I claim and desire to secure by Letters Patent is:

1. A method of producing a sequence of optical images for successive viewing to create an illusion of depth of a scene having a plurality of planes of depth, which consists in passing a beam of light from said scene through a lens set to a sensitized medium, while constantly maintaining a preponderance of the beam of light effective in the exposures as a smaller fraction of the light beam is subtracted in a recurrent sequence at selected points in a plane transversely of the direction of propagation of said light beam and in synchronism with the exposure of a sequence of frames of film, whereby an internal modulation of the beam of light will be created to vary the emphasis of the parallax while varying the light density of the contour of local foreground images to give the illusion of separation between depth planes.

2. A method of producing a sequence of optical images for successive viewing to create a photographic illusion of depth of a scene having a plurality of depth planes, which consists in sharply focusing images in a selected foreground plane upon the image reception area of a photographic film by passing the beam of light from the scene through optical elements and subdividing said beam of light laterally into a plurality of symmetrically arranged relatively narrow vertical parallel sections passing alternate sections directly to the image reception area and the intermediate sections through a plurality of symmetrically arranged refractors to the image reception area, whereby the refracted light beam sections will overlay portions of the direct light beam sections upon the image reception area.

3. A method of producing a sequence of optical images for successive viewing to create a photographic illusion of depth of a scene having background and foreground objects, which consists in passing a beam of light from said scene through a lens objective and through a transverse light aperture of a predetermined pattern, whereby selected viewpoints of the scene being photographed will have light dominance over other viewpoints of the scene, said beam of light being interrupted at a plurality of points across said aperture in consecutive action and in a time cycle, thereafter directing said beam of light onto an image reception plane.

4. A method of producing a sequence of optical images for successive viewing to create a photographic illusion of depth, which consists in creating a light aperture pattern transversely of the equatorial area of a light beam, whereby gradation in light density may be created in adjacent areas of the aperture field, and then interrupting the emerging light beam in said different light density areas and in a given time cycle, and thereafter commingling portions of the light beam from foreground and background planes of the photographic scene to cause said beam portion to strike the image reception plane of a film with all images in appearance of relatively sharp focus.

5. A method of producing a sequence of optical images for successive viewing to create a photographic illusion of depth, which consists in creating a light aperture pattern transversely of the equatorial area of a light beam, whereby gradation in light density may be created in adjacent areas of the aperture field, and then interrupting the emerging light beam in said different light density areas and in a given time cycle, thereafter commingling portions of the light beam from foreground and background planes of the photographic scene to cause said beam portion to strike the image reception plane of a film with all images in appearance of relatively sharp focus, and to cause some of the commingled image formations to be overlaid intermittently in laterally displaced positions whereby the background rays will undercut the vertical contour edges of the foreground rays to produce the effect of contour in the various images and the illusion of depth in the photographed plane.

6. Apparatus for producing a sequence of optical images for successive viewing to create a photographic illusion of depth of a scene having foreground and background objects, which comprises an objective lens set directing a beam of light from a photographed scene to a photographic film, said lens set acting to present foreground objects to the plane of said film in sharp focus, and a plurality of means tending to subdivide the beam of light transversely into a plurality of parallel vertically extending areas, alternate areas permitting normal passage of light to the photographic film and intermediate areas tending to offset portions of the beam of light laterally, whereby said last named light beam portions will undercut the vertical contour edges of the portions of light passing directly to the photographic film.

7. The structure of claim 6 including means for varying the degree of lateral deflection of said laterally deflected beams of light.

8. The structure of claim 25 in which the modulator includes a plurality of arcuate blades moving in synchronism with the film driving mechanism, said blades being mounted upon arms at different radial lengths, whereby the different blades in the set will interrupt light emanating from a different viewpoint of the scene being photographed, the total area subtracted from each scene photographed being substantially equal throughout the cycle of operation of the modulator.

9. In an apparatus of the character described, a refractor unit comprising a holder and a plurality of parallel refractor elements supported thereby and disposed in spaced parallel relation to each other, whereby a portion of a beam of light may pass between said refractor elements and portions of a beam of light may pass through refractor elements and be shifted laterally.

10. The structure of claim 9 including means for adjusting said individual refractor elements to permit different degrees of refraction to be obtained.

11. The structure of claim 9 including means for adjusting said individual refractor elements to permit different degrees of refraction to be obtained, said means acting simultaneously to dispose the different refractor elements at desired angles to the path of the beam of light.

12. The structure of claim 9 in which the refractor elements are arranged symmetrically in pairs upon the opposite sides of the optical axis of the structure, and means for simultaneously varying the angle of each pair of elements separately.

13. In optical image apparatus, the structure comprising an image reception area, a lens aperture, a lens formulating an optical image on the image reception area, and a pair of refractors positioned transversely of said aperture and arranged in symmetrical local portions thereof and at opposed angles relative to the plane of the lens, the effective aperture including an area extending beyond each outermost side of the refractors.

14. In optical image apparatus, the structure including an image reception area, lenses formulating an image, a lens aperture through which the light beam passes, a plurality of light gates disposed across the aperture and identified respectively with a multiplicity of light sections of the aperture, whereby a plurality of light rays will be controlled to pass through the aperture and vary in light modulation, and a second light gate affecting the travel of the light rays passing through the aperture and controlling the unmodulated rays, whereby the control of the second gate will establish light values of the rays different from the light values established by the first named gate.

15. In optical image apparatus, a structure including an image reception area, a lens aperture, a lens formulating an optical image on the image reception area, a plurality of separate light gates disposed in a plane normal to the optical axis of the lens and acting to vary the width of the light beam transversely of the aperture opening, and a plurality of refractors disposed in a plane normal to the optical axis and receiving the light beam, said refractors being spaced horizontally from each other, whereby portions of the beam will alternately pass through the refractors and between them.

16. In optical image apparatus including an image reception area, a lens aperture, an objective lens formulating an optical image on the image reception area, a compound objective lens including a forward lens element and a rear lens element, an elongated aperture disposed in a plane normal to the optical axis of the lens and extending diametrically thereacross, said aperture comprising a central viewpoint positioned across the optical axis of the objective lens, a plurality of contiguous viewpoints progressively positioned at diametrically opposite sides of the central viewpoint, a series of separate movable leaves defining an edge of said elongated aperture, and means for adjusting said leaves independently whereby the configuration of the margin of the aperture may be established.

17. In optical image apparatus including an image reception area, a lens aperture, an objective lens formulating an optical image on the image reception area, a compound objective lens including a forward lens element and a rear lens element, an elongated aperture disposed in a plane normal to the optical axis of the lens and extending diametrically thereacross, said aperture comprising a central viewpoint positioned across the optical axis of the objective lens, a plurality of contiguous viewpoints progressively positioned at diametrically opposite sides of the central viewpoint, a lower opaque leaf defining the lower boundary of said aperture, a plurality of upper opaque leaves mounted to move in a plane normal to the optical axis, and means for adjusting said upper leaves independently whereby the configuration of the aperture may be established.

18. In an optical image aperture having an image reception area, a lens aperture, and an objective lens formulating an optical image on the image reception area; a plurality of individual opaque light gates disposed collectively in a plane substantially normal to the path of the optical axis, said light gates including a central light gate adapted to intercept the optical axis and pairs of light gates disposed on diametrically opposite sides thereof, and adjusting means whereby said light gates may be individually set to create a desired aperture pattern, whereby the light gates form a light beam differing in intensity corresponding to differing viewpoint positions transversely of the objective.

19. In an optical image apparatus, a structure comprising a pair of refractors positioned in the path of a beam of light and disposed at equal distance at opposite sides of the optical axis of said beam of light and at equal opposite acute angles, and a second pair of refractors positioned in the beam of light in the plane of the first named refractors and equally spaced at the outer sides thereof, said second named refractors being equally disposed at opposite acute angles relative to the optical axis and being set at different angles from that of the first named pair of refractors.

20. The structure of claim 19 including means for simultaneously adjusting the angles of said refractors with relation to the optical axis.

21. In an optical image system, an image reception area, a light aperture, an objective lens through which a beam of light passes to the image reception area, a pair of light refractors positioned upon opposite sides of the optical axis of the lens and equidistant from said axis, said refractors being designed to deflect light rays in a predetermined amount and in opposite directions, a second pair of refractors positioned equidistant and on the outside of the first pair of refractors, the second pair of refractors deflecting light rays in opposite directions to each other and in a predetermined and substantially greater amount than the deflection produced by the first pair of refractors, said refractors being disposed parallel and spaced apart whereby a single middle space will traverse the optical axis of the lens to permit undeflected light in a predetermined amount to pass to the image reception area, the refractors at opposite sides thereof being spaced to permit lesser amounts of undeflected light to pass between the refractors, all of said refractors and the spaces occurring between them being in a substantially common plane normal to the optical axis.

22. In apparatus of the character described, an objective lens set through which a beam of light passes from an image to an image reception field, said lens set being capable of longitudinal adjustment for focus, a light modulator disposed in a plane normal to the optical axis of the lens set and acting to intercept portions of the light beam, and means for longitudinally adjusting the light modulator in coordination with the adjustment of the lens set.

23. A method of producing a sequence of optical images for successive viewing to create an illusion of depth of a scene having a plurality of planes of depth, which consist in passing a beam of light from said scene through a lens set to a light receptive medium while constantly maintaining a preponderance of the beam of light effective in the successive exposures as a smaller fraction of the light beam is subtracted in a recurrent sequence in selected points in a plane transversely of the optical axis of said light beam and in synchronism with the exposure of a sequence of frames of film, whereby an internal modulation of the beam of light will be created to vary the emphasis of the parallax while varying the light density of the contour of local foreground images to create the illusion of separation between depth planes on the image reception area.

24. Apparatus for producing a sequence of diversified optical images for successive viewing to create a pictorial illusion of depth of a scene having a plurality of planes of depth, which apparatus includes a lens objective having forward and rearward spaced element, a shutter and feed mechanism for moving a photographic film across a photographic plane disposed in the path of the beam of light passing through said lens objective, and in a manner to produce successive frames of motion picture film, and a light beam modulator moving between said lens elements and across the beam of light and acting to subtract a minority of the rays of light from the beam in coordination with different viewpoints of the scene recurrently and in a time cycle synchronized with the exposure of successive frames of the photographic film.

25. In apparatus of the character described, a subtractive light beam modulator adapted to move transversely of the beam of light and in synchronism with a camera film feeding device, means forming a part of said modulator whereby successive portions of the beam of light may be interrupted from different viewpoints of the photographic scene and upon successive frames of film as the light passes from the scene to a photographic plane, said modulator including a plurality of arcuate blades moving in synchronism with the film feeding mechanism, said blades being mounted upon arms of different radial length, whereby the different blades in the set will interrupt light emanating from a different viewpoint of the scene being photographed upon successive frames of film.

26. Optical image apparatus comprising an image reception area, a lens having a forward element and a rearward element through which a beam of light passes from a scene, the scene having a plurality of planes of depth, a light gate structure interposed between the two elements of the lens and in the path of the beam of light, said structure comprising a plurality of contiguous light gate leaves, a pair of vertically extending refractors, one of which is set on each side of the optical axis and between the lens elements and being substantially parallel to the light gate leaves, one of said refractors being in juxtaposition facing one light gate leaf, and the other of said refractors being in juxtaposition facing another of said light gate leaves, whereby said complementary light gate leaves control the amount of light passing locally through the refractors.

27. The structure of claim 26 in which said light gate structure is provided with a center leaf to control the amount of light passing normally through the passage at the center of the lens and adjacent to the optical axis without other refraction, whereby said center light gate regulates the amount of light pertaining to a normal critical focus of the lens while the two first mentioned light gate leaves regulate amounts of light pertaining to a different focus of the lens.

28. In apparatus of the character described, a subtractive light beam modulator adapted to move transversely of a beam of light as rotating upon an axis parallel to the optical axis of the apparatus, means forming a part of said modulator whereby successive relatively small portions of the beam of light may be interrupted from different viewpoints of the photographic scene as it passes from the scene to a photographic plane while constantly maintaining a preponderance of the beam of light effective in the exposure, said means including transparent and opaque sections of said rotating modulator whereby light rays emanating from different viewpoints of the scene and occurring in a transverse plane intercepting the beam will be separately interrupted in a desired sequence transversely of the beam and for selected individual time periods in a recurrent time cycle.

29. The method of blending a balanced parallax within a scene and in an optical picture emanating from a plurality of depth planes of said scene which consist in passing a beam of light from the scene through an objective lens set and through a deformable laterally elongated aperture and onto an image reception area, said aperture being defined by opaque means disposed above and below it, then restricting the vertical width of the aperture in a first selected local minority portion of the beam to coordinate said portion with the natural light value of the general scene, then passing said first local minority portion through the aperture at a position laterally offset from the optical axis of the lens, concurrently restricting a second local minority portion of the beam coordinated to the natural light value of the general scene, then passing said second local minority portion of the light beam through the aperture at a position located symmetrically on the diametrical side of the optical axis from that of the first minority portion, then varying the laterally elongated aperture symmetrically at opposite sides of the optical axis through which minor portions of the light beam pass and by which said portions are coordinated to the natural light value of the general scene, then maintaining the light aperture in the pattern thus produced to thereby formulate on the image reception area a composite image of the general scene blended by superimposition of a plurality of counterpart images from separated viewpoint positions and of the same light value which are in turn superimposed upon other counterpart images from different viewpoint positions and of different light values.

30. A method of blending a balanced parallax within a scene in an optical picture emanating from a plurality of depth planes in said scene consisting in passing a beam of light through a lens and a laterally elongated deformable light aperture and onto an image reception area and formulating selected portions of the beam at diametrically opposite sides of the optical axis and in focus locally different from the normal focus of the lens, then passing the normal primary focused portion of the beam through the center of said aperture thereby formulating a composite image of the scene blended by superimposition of a plurality of laterally offset counterpart images from separated viewpoint positions and a counterpart image from an intermediate viewpoint position and in a different focus.

IVAN M. TERWILLIGER.

REFERENCES CITED

The following references are of record in the file of this patent:

UNITED STATES PATENTS

| Number | Name | Date |
|---|---|---|
| 1,897,274 | Oswald | Feb. 14, 1933 |
| 1,673,793 | Ames, Jr. | June 19, 1928 |
| 2,045,093 | Newcomer | June 23, 1936 |
| 2,286,242 | Terwilliger | June 16, 1942 |
| 1,911,320 | Barbier | May 30, 1933 |
| 1,161,910 | Ulysse | Nov. 30, 1915 |
| 2,258,903 | Mitchell | Oct. 14, 1941 |

FOREIGN PATENTS

| Number | Country | Date |
|---|---|---|
| 331,285 | Great Britain | July 3, 1930 |
| 360,977 | Great Britain | Nov. 16, 1931 |